(12) United States Patent
Kawamura et al.

(10) Patent No.: US 7,902,707 B2
(45) Date of Patent: Mar. 8, 2011

(54) ANISOTROPIC PERMANENT MAGNET MOTOR

(75) Inventors: Kiyomi Kawamura, Osaka (JP);
Fumitoshi Yamashita, Nara (JP);
Hiroshi Murakami, Osaka (JP)

(73) Assignee: Panasonic Corporation, Osaka (JP)

( * ) Notice: Subject to any disclaimer, the term of this patent is extended or adjusted under 35 U.S.C. 154(b) by 216 days.

(21) Appl. No.: 12/269,268

(22) Filed: Nov. 12, 2008

(65) Prior Publication Data

US 2009/0127960 A1    May 21, 2009

(30) Foreign Application Priority Data

Nov. 12, 2007   (JP) .................. 2007-292842

(51) Int. Cl.
*H02K 1/27* (2006.01)
(52) U.S. Cl. .......... 310/156.43; 310/156.45; 310/156.34; 310/154.28
(58) Field of Classification Search .......... 310/156.01–156.84, 154.28
See application file for complete search history.

(56) References Cited

U.S. PATENT DOCUMENTS

| | | | | |
|---|---|---|---|---|
| 5,898,253 | A * | 4/1999 | El-Antably et al. | 310/261.1 |
| 6,111,332 | A * | 8/2000 | Post | 310/90.5 |
| 6,657,344 | B2 * | 12/2003 | Post | 310/90.5 |
| 2002/0180294 | A1 * | 12/2002 | Kaneda et al. | 310/156.43 |
| 2002/0180295 | A1 * | 12/2002 | Kaneda et al. | 310/156.43 |
| 2003/0106615 | A1 * | 6/2003 | Hirota et al. | 148/101 |
| 2003/0117032 | A1 * | 6/2003 | Komuro et al. | 310/156.08 |
| 2005/0001499 | A1 * | 1/2005 | Calico | 310/156.08 |
| 2005/0040721 | A1 * | 2/2005 | Kusase et al. | 310/156.43 |
| 2005/0081959 | A1 * | 4/2005 | Kim et al. | 148/105 |

FOREIGN PATENT DOCUMENTS

WO   WO 2005/008862 A   1/2005

\* cited by examiner

*Primary Examiner* — Quyen Leung
*Assistant Examiner* — Naishadh N Desai
(74) *Attorney, Agent, or Firm* — Brinks Hofer Gilson & Lione

(57) ABSTRACT

An anisotropic permanent magnet motor includes a stator and a rotor opposed to teeth of the stator with a gap therebetween, and the rotor includes an anisotropic permanent magnet disposed on a surface of a rotor yoke. The anisotropic permanent magnet has an orientation direction set in a direction normal to the outer-peripheral surface in a range of both $\theta r°/2$ from a magnetic pole center and continuously inclined toward a magnetic pole end with respect to a direction normal to the outer-peripheral surface.

8 Claims, 10 Drawing Sheets

|  | COMPARATIVE EXAMPLE | EXAMPLE 1 | EXAMPLE 2 | EXAMPLE 3 |
|---|---|---|---|---|
| NUMBER OF POLES | 16 | 16 | 8 | 8 |
| NUMBER OF SLOTS | 12 | 12 | 9 | 9 |
| $\theta p/\theta c/3$ | 1 | 1 | 3 | 3 |
| $\theta r/\theta c$ | 3 | 1 | 1 | 6 |
| lt/lr | 1 | 1 | 3 | 3 |
| COGGING TORQUE (mN·m) | 28.00 | 1.30 | 0.03 | 0.15 |
| TORQUE CONSTANT | 1.00 | 1.02 | 1.00 | 1.12 |
| 1×Zst MAGNETOMOTIVE FORCE COMPONENT (e-6) | 235.0 | 1.0 | 0.4 | 2.8 |
| 2×Zst MAGNETOMOTIVE FORCE COMPONENT (e-6) | 52000.0 | 3000.0 | 106.0 | 188.0 |
| 3×Zst MAGNETOMOTIVE FORCE COMPONENT (e-6) | 1740.0 | 128.0 | 0.1 | 0.9 |
| 4×Zst MAGNETOMOTIVE FORCE COMPONENT (e-6) | 210000.0 | 600.0 | 9.4 | 14.8 |

RADIAL ORIENTATION
(RADIAL MAGNETIZATION)

POLAR ANISOTROPIC
ORIENTATION
(POLAR ANISOTROPIC
MAGNETIZATION)

ANISOTROPIC PERMANENT MAGNET MOTOR

REFERENCE TO THE RELATED APPLICATIONS

This application claims priority under 35 U.S.C. §119 to Japanese Patent Application No. JP2007-292842 filed on Nov. 12, 2007, the entire content of which is hereby incorporated by reference.

BACKGROUND OF THE INVENTION

1. Field of the Invention

The present invention relates to an anisotropic permanent magnet motor provided with an anisotropic permanent magnet.

2. Description of the Related Arts

Recently, an increase in output and a decrease in size of a permanent magnet motor used in a household electronic appliance have been further demanded. Also, low vibration and low noise have been demanded.

In such a circumstance, a ferrite bond magnet having a maximum energy product of about 2 MGOe (16 KJ/m$^3$), a ferrite sintered magnet having a maximum energy product of about 5 MGOe (40 KJ/m$^3$), or an isotropic rare-earth bond magnet having a maximum energy product of about 9 MGOe (72 KJ/m$^3$) which has been used so far cannot satisfy such a demand. Therefore, it has been considered to use an anisotropic permanent magnet having a maximum energy product larger than those of the magnets described above.

However, a magnetic flux direction of the anisotropic permanent magnet is determined during an orientation process. Therefore, in case of orienting and magnetizing the anisotropic permanent magnet so far, radial orientation and magnetization or polar anisotropic orientation and magnetization are carried out in general.

FIG. 15 is a conceptual diagram illustrating a magnetic flux direction in case of the radial orientation (radial magnetization), and a magnetic flux direction in case of the polar anisotropic orientation (polar anisotropic magnetization) according to the related art.

In case of the radial orientation (radial magnetization), since the orientation and magnetization are just set in a radial direction, the orientation and magnetization are easily carried out. However, since the magnetic flux abruptly changes at a boundary between magnetic poles, a problem arises in that cogging torque is large.

On the other hand, in case of the polar anisotropic orientation (polar anisotropic magnetization), since the magnetic flux changes in a sine-wave shape at the boundary between the magnetic poles, it is possible to reduce the cogging torque. However, since it is necessary to set a thickness of the magnet to a half of a width of one magnetic pole, a problem arises in that the magnet is thickened to thereby cause an increase in size of the motor.

Therefore, in order to solve such problems, a technique is disclosed in, for example, WO2005/008862. WO2005/008862 discloses a motor including an anisotropic permanent magnet motor provided with a magnetic pole center magnetized in a radial direction and a boundary disposed between magnetic poles and magnetized in a polar anisotropic manner. Such a motor is capable of reducing the cogging torque and realizing an increase in torque.

However, in the technique disclosed in WO2005/008862, since the boundary between the magnetic poles is magnetized in a polar anisotropic manner, it is difficult to make the magnet thin. As a result, a problem arises in that it is difficult to realize a decrease in size and weight of the motor.

SUMMARY OF THE INVENTION

In order to solve the above-described problems, the anisotropic permanent magnet motor according to the invention adopts the following configuration. There is provided an anisotropic permanent magnet motor including: a stator which includes a stator core provided with an annular stator yoke, a plurality of teeth protruding from the stator yoke in a radial direction, and a slot formed between the teeth and a plurality of coils wound around the teeth; and a rotor which includes a cylindrical rotor yoke and an anisotropic permanent magnet disposed on a surface of the rotor yoke and is opposed to the teeth with a gap therebetween, wherein the anisotropic permanent magnet has an orientation direction set in a direction normal to the outer-peripheral surface in a range of both $\theta r°/2$ from a magnetic pole center and continuously inclined toward a magnetic pole end with respect to a direction normal to the outer-peripheral surface, wherein when an angle for each pole is denoted by $\theta p$, an angle for one cycle of cogging torque generated by the anisotropic permanent magnet is denoted by $\theta c$, and a natural number is denoted by a, $\theta p/\theta c=3\times a$, wherein when a maximum value of the cogging torque in a range of $\theta r/\theta c \leq \{(\theta p/\theta c)-2\}$ is denoted by an allowable maximum value of the cogging torque, $\theta r/\theta c$ corresponding to the cogging torque equal to the allowable maximum value in a range where $\theta r/\theta c$ satisfies a relationship of $\{(\theta p/\theta c)-2\} \leq \theta r/\theta c \leq \{(\theta p/\theta c)-1\}$ is obtained, and wherein an angle of $\theta r$ is set so that $\theta r/\theta c$ is not more than P.

With such a configuration, the anisotropic permanent magnet motor according to the invention is capable of realizing a decrease in size and weight of the motor by thinning the anisotropic permanent magnet and realizing a reduction in cogging torque and an increase in efficiency.

BRIEF DESCRIPTION OF THE DRAWINGS

FIG. 14 is a diagram illustrating the comparison results of the motors according to Comparative Example and Examples of the invention.

DETAILED DESCRIPTION OF THE INVENTION

Hereinafter, an anisotropic permanent magnet motor according to the invention will be described with reference to the accompanying drawings.

Embodiment

Figure 1:
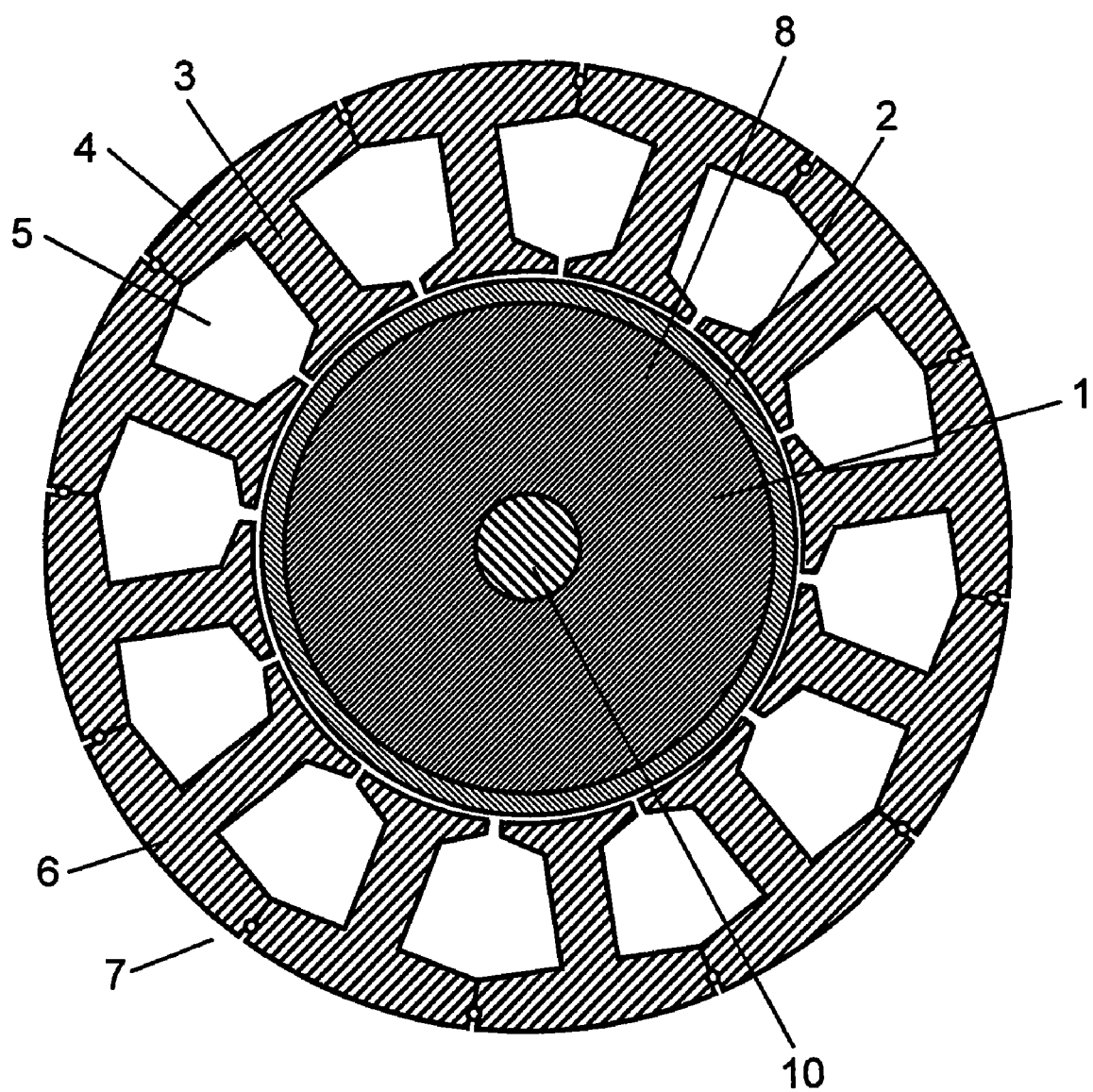
FIG. 1 is a schematic cross-sectional diagram illustrating a motor according to an embodiment of the invention.

FIG. 1 is a schematic cross-sectional diagram illustrating an anisotropic permanent magnet motor according to an embodiment of the invention.

The anisotropic permanent magnet motor according to the embodiment of the invention includes stator 7 and rotor 8.

Stator 7 includes stator core 6 and a plurality of coils (not shown) wound around stator core 6. Stator core 6 includes annular stator yoke 4, multiple teeth 3 protruding inward from stator yoke 4 in a radial direction, slot 5 formed between teeth 3.

Rotor 8 includes cylindrical rotor yoke 1, anisotropic permanent magnet 2 disposed on the outer periphery of rotor yoke 1, and rotary shaft 10 disposed at the center of rotor yoke 1. Rotor 8 is opposed to teeth 3 of stator 7 with a gap therebetween.

Hereinafter, as shown in FIG. 1, although an inner-rotor-type motor is exemplified in which the rotor is disposed in the inner periphery of the stator, the invention is not limited to the inner-rotor-type motor, but may be applied to an outer-rotor-type motor. In case of the outer-rotor-type motor, the teeth protrude from the stator yoke of the stator toward the outer periphery, and the rotor provided with the anisotropic permanent magnet is disposed on the inner periphery thereof so as to be opposed to the teeth.

Figure 2:
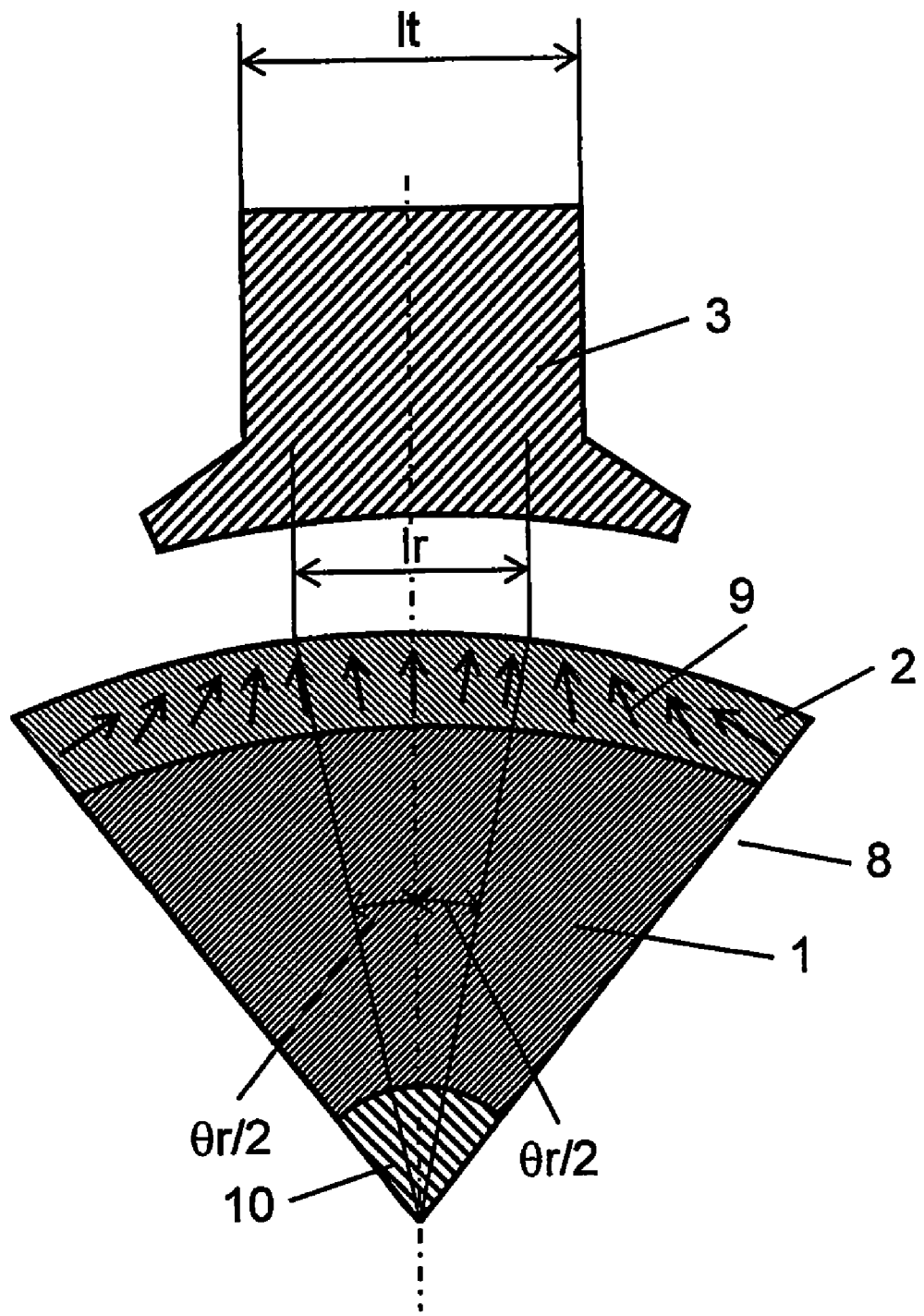
FIG. 2 is a cross-sectional diagram illustrating a rotor and teeth corresponding to one magnetic pole of an anisotropic permanent magnet of the motor according to the embodiment of the invention.
Figure 3:
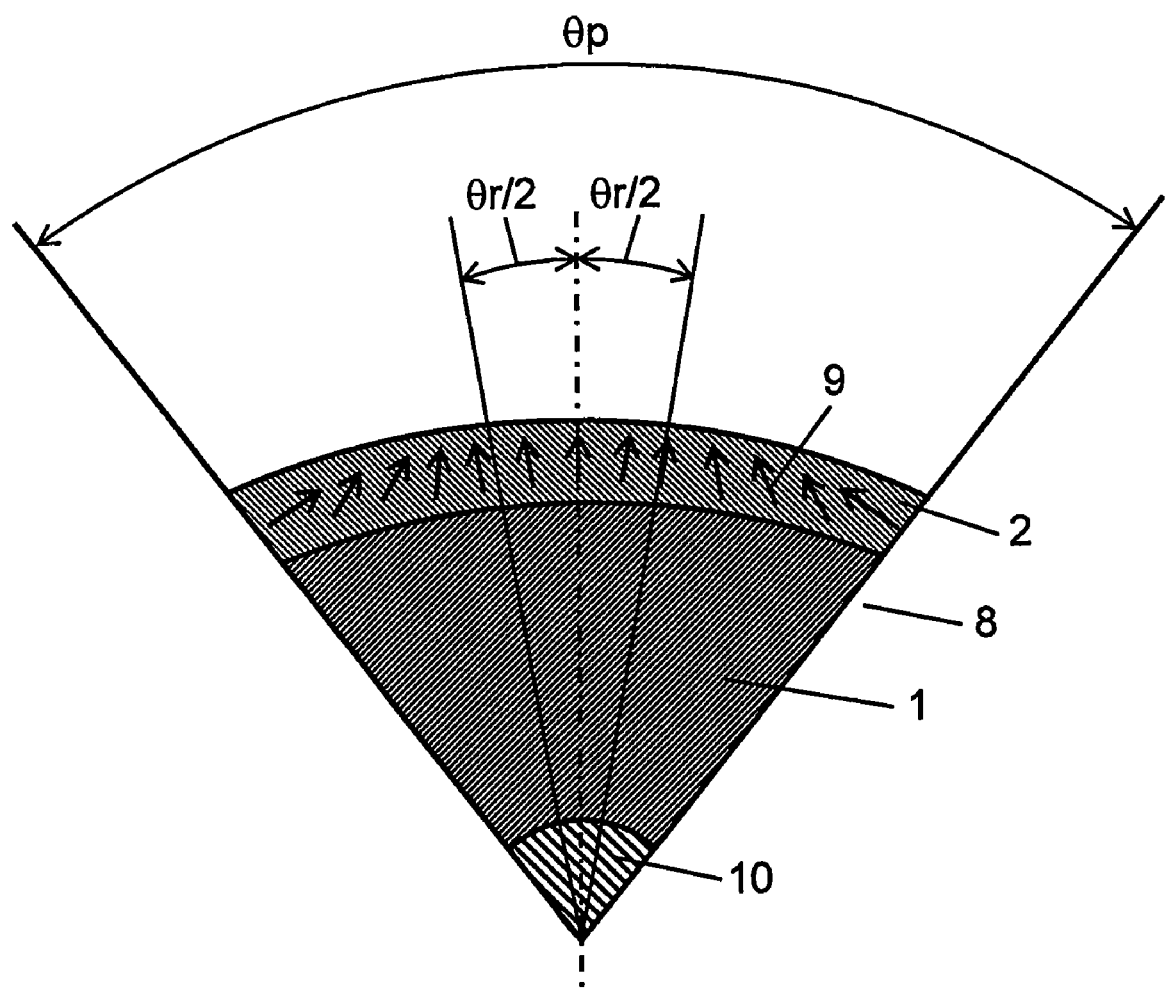
FIG. 3 is a partially enlarged diagram illustrating a part shown in FIG. 2.

FIG. 2 is a cross-sectional diagram illustrating rotor 8 and teeth 3 corresponding to one magnetic pole of anisotropic permanent magnet 2. FIG. 3 is a partially enlarged diagram illustrating a part shown in FIG. 2.

Anisotropic permanent magnet 2 has orientation direction 9 set in a direction normal to the outer-peripheral surface in a range of both θr°/2 from a magnetic pole center and continuously inclined toward a magnetic pole end with respect to a direction normal to the outer-peripheral surface. That is, as shown in FIGS. 2 and 3, anisotropic permanent magnet 2 has orientation direction 9 set in a direction normal to the outer-peripheral surface within a range of both θr°/2 from the magnetic pole center. Further, in a range exceeding both θr°/2, anisotropic permanent magnet 2 has orientation direction 9 continuously inclined toward the magnetic pole end with respect to a direction normal to the outer-peripheral surface. Orientation direction 9 having the inclination is inclined toward the magnetic pole center. An inclination with respect to a normal direction is 0 in a range of both θr°/2 from the magnetic pole center and gradually increases toward the magnetic pole end. An inclination at the magnetic pole end with respect to a perpendicular direction is desirably set to a range not exceeding 90°.

In the present embodiment, cogging torque is reduced by appropriately setting θr (hereinafter, referred to as a boundary angle) shown in FIGS. 2 and 3. Hereinafter, the boundary angle θr for determining the range of both θr°/2 from the magnetic pole center described above will be described.

First, a cogging angle θc as an angle for one cycle of the cogging torque based on the number of slots and magnetic poles of the anisotropic permanent magnet and a magnetic pole angle θp as an angle for one pole of the anisotropic permanent magnet will be described by using various examples in which different numbers of slots and magnetic poles are combined with each other.

The cogging torque corresponding to the least common multiple of the number of magnetic poles and slots is generated for one rotation (360°). For this reason, for example, in case of 16 poles and 12 slots, the cogging torque is generated 48 times for one rotation (360°). In case of 12 poles and 18 slots, the cogging torque is generated 36 times for one rotation (360°). In case of 10 poles and 12 slots, the cogging torque is generated 60 times for one rotation (360°). In case of 8 poles and 9 slots, the cogging torque is generated 72 times for one rotation (360°).

That is, in case of the motor having 16 poles and 12 slots, the cogging angle θc as the angle for one cycle of the cogging torque is 7.5°. In the same manner, in case of the motor having 12 poles and 18 slots, the cogging angle θc is 10°. In case of the motor having 10 poles and 12 slots, the cogging angle θc is 6°. In case of the motor having 8 poles and 9 slots, the cogging angle θc is 5°.

In case of 16 poles and 12 slots, the magnetic pole angle θp as the angle for one pole is 22.5°. In the same manner, in case of 12 poles and 18 slots, the magnetic pole angle θp is 30°. In case of 10 poles and 12 slots, the magnetic pole angle θp is 36°. In case of 8 poles and 9 slots, the magnetic pole angle θp is 45°.

Next, the boundary angle θr according to the present embodiment will be described. Hereinafter, the boundary angle θr will be described by mainly referring to a cogging-angle-boundary-angle ratio (hereinafter, simply referred to as an angular ratio) θr/θc which is the boundary angle θr with respect to the cogging angle θc.

Figure 4:
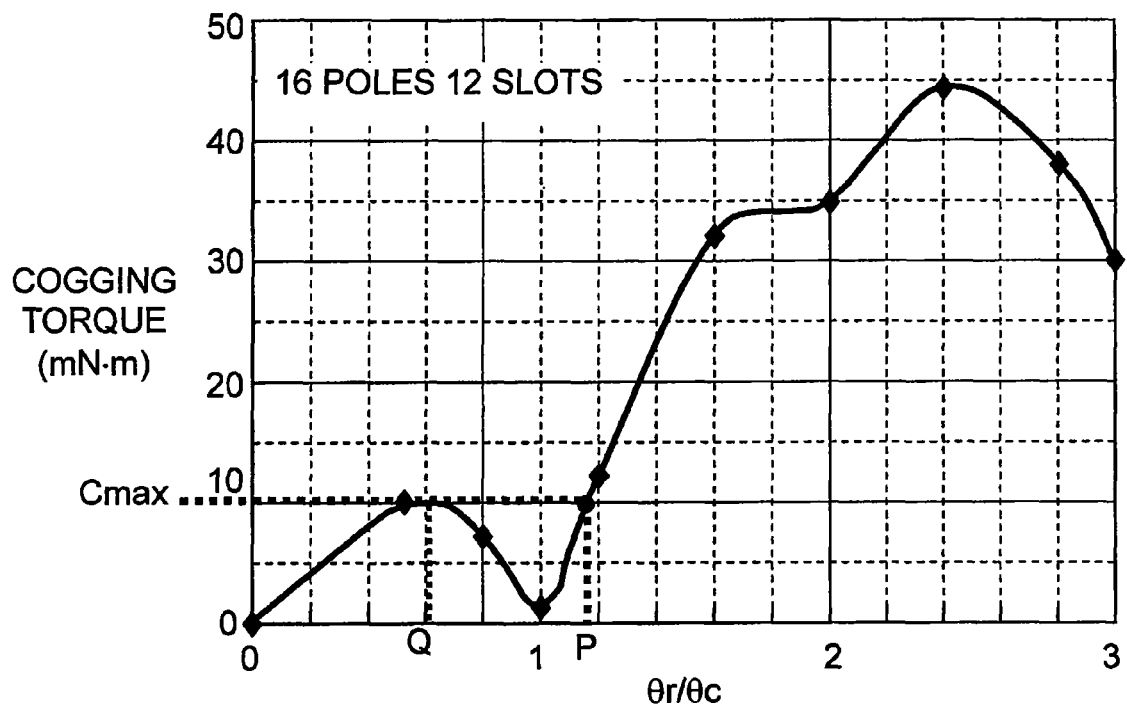
FIG. 4 is a diagram illustrating a relationship between cogging torque and an angular ratio $\theta r/\theta c$ in case of the motor having 16 poles and 12 slots according to the embodiment of the invention.
Figure 5:
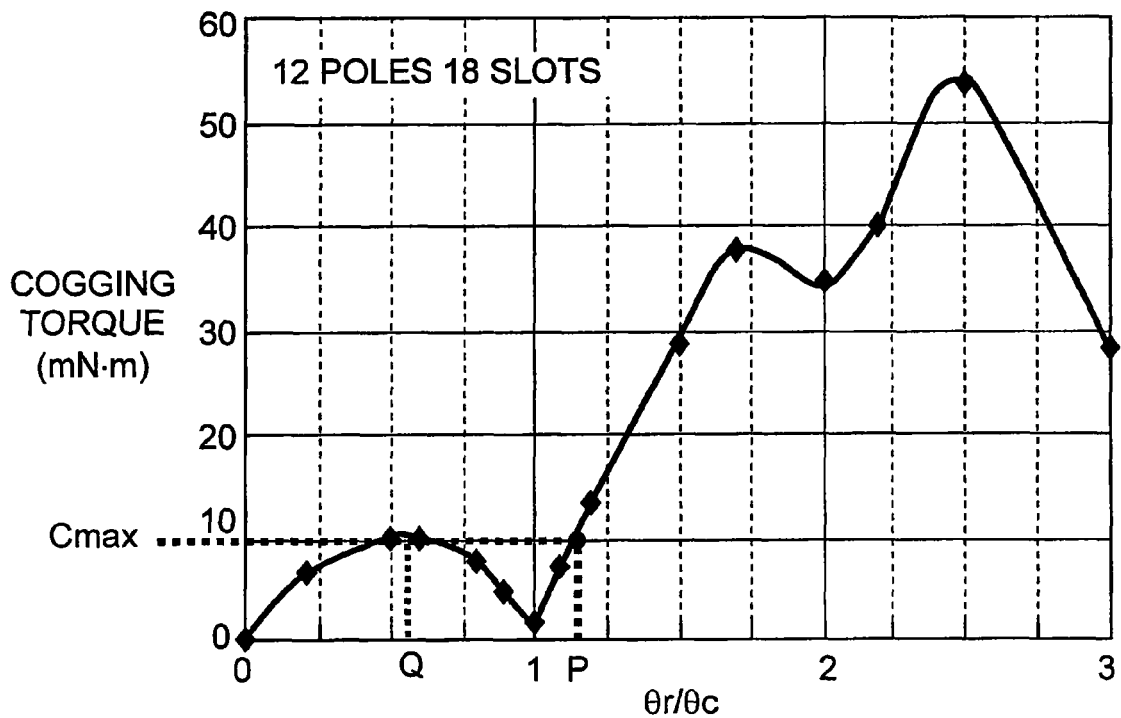
FIG. 5 is a diagram illustrating a relationship between the cogging torque and the angular ratio $\theta r/\theta c$ in case of the motor having 12 poles and 18 slots according to the embodiment of the invention.
Figure 6:
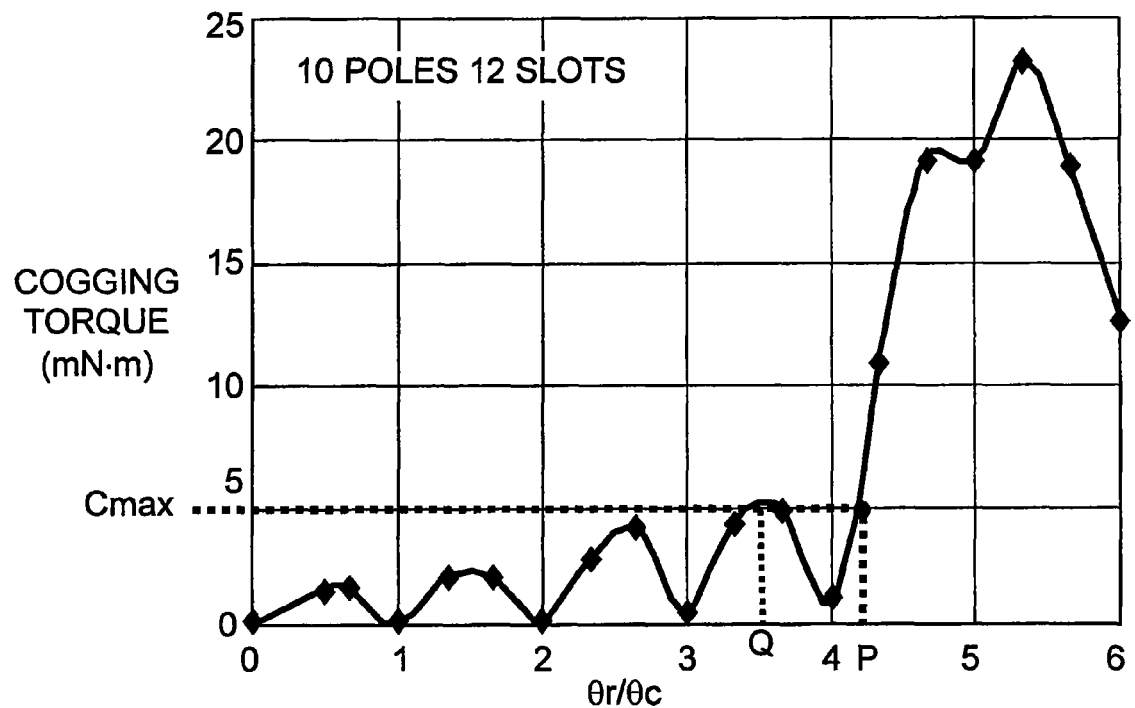
FIG. 6 is a diagram illustrating a relationship between the cogging torque and the angular ratio $\theta r/\theta c$ in case of the motor having 10 poles and 12 slots according to the embodiment of the invention.
Figure 7:
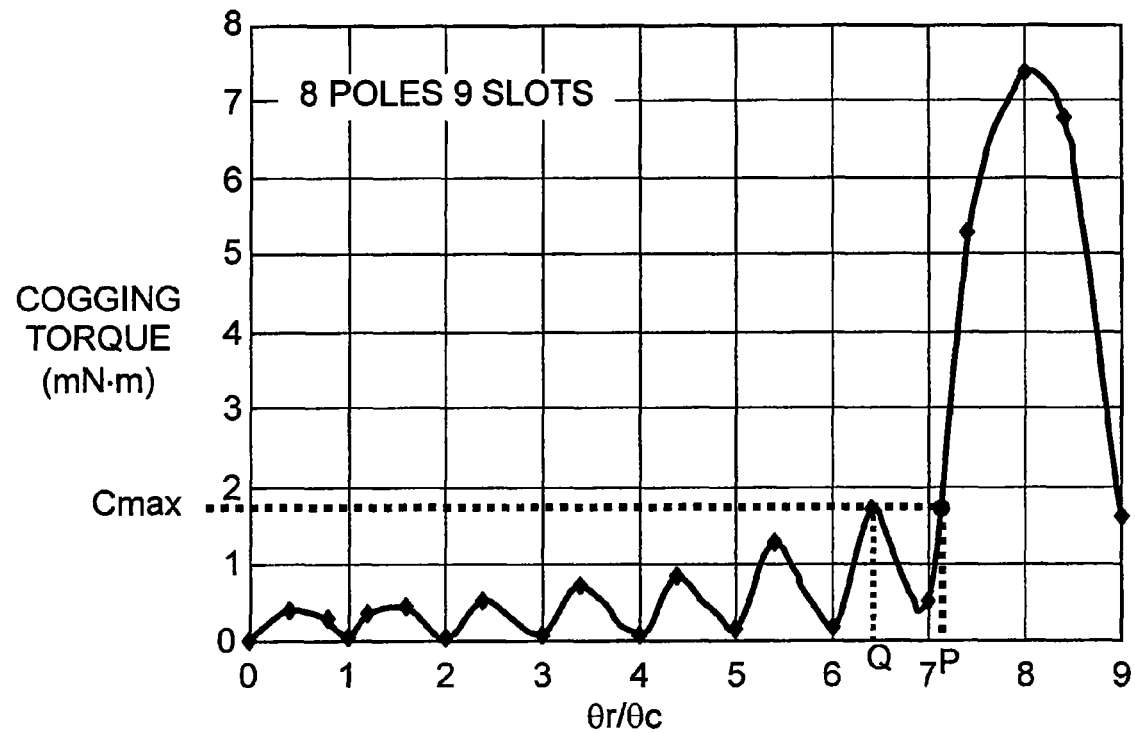
FIG. 7 is a diagram illustrating a relationship between the cogging torque and the angular ratio $\theta r/\theta c$ in case of the motor having 8 poles and 9 slots according to the embodiment of the invention.

FIG. 4 is a diagram illustrating a relationship between cogging torque and an angular ratio θr/θc in case of the anisotropic permanent magnet motor having 16 poles and 12 slots. FIG. 5 is a diagram illustrating a relationship between the cogging torque and the angular ratio θr/θc in case of the anisotropic permanent magnet motor having 12 poles and 18 slots. FIG. 6 is a diagram illustrating a relationship between the cogging torque and the angular ratio θr/θc in case of the anisotropic permanent magnet motor having 10 poles and 12 slots. FIG. 7 is a diagram illustrating a relationship between the cogging torque and the angular ratio θr/θc in case of the anisotropic permanent magnet motor having 8 poles and 9 slots. The reason why the angular ratio θr/θc shown in FIGS. 4 to 7 is equal to P or Q will be described hereinafter.

Here, as shown in FIGS. 4 to 7, in case of the motor having 16 poles and 12 slots and the motor having 12 poles and 18 slots, the cogging torque has the minimum value when the angular ratio $\theta r/\theta c$ is 1. In the same manner, in case of the motor having 10 poles and 12 slots, the cogging torque has the minimum value when the angular ratio $\theta r/\theta c$ is 1, 2, 3, and 4. In case of the motor having 8 poles and 9 slots, the cogging torque has the minimum value when the angular ratio $\theta r/\theta c$ is 1, 2, 3, 4, 5, 6, and 7. That is, in the configuration shown in FIGS. 2 and 3, it is the most desirable to select the angular ratio $\theta r/\theta c$ having the minimum value in order to reduce the cogging torque. For example, in case of the motor having 16 poles and 12 slots, since the cogging torque has the minimum value when the angular ratio $\theta r/\theta c$ is 1, the boundary angle $\theta r$ may be set to be equal to the cogging angle $\theta c$. Meanwhile, in case of the motor having 8 poles and 9 slots, the boundary angle $\theta r$ may be 1, 2, 3, 4, 5, 6, or 7 times the cogging angle $\theta c$.

Incidentally, likewise, the number when the cogging torque has the minimum value is different depending on the combination of the number of magnetic poles and slots. For this reason, the angular ratio $\theta r/\theta c$ when the cogging torque has the minimum value can be obtained as below.

That is, in anisotropic permanent magnet 2 according to the present embodiment, when the angle for one pole is denoted by the magnetic pole angle $\theta p$, the angle for one cycle of the cogging torque generated by the anisotropic permanent motor is denoted by the cogging angle $\theta c$, and the natural number is denoted by a as described above, the following relationship is satisfied.

$$\theta p/\theta c = 3 \times a$$

$$\theta r/\theta c \leq \{(\theta p/\theta c)-2\}$$

$$\theta r/\theta c = \text{natural number}$$

First, in the magnetic pole angle $\theta p$ with respect to the cogging angle $\theta c$, $\theta p/\theta c=3\times a$. That is, in the present embodiment, the invention is applied to the motor having the number of magnetic poles and slots in which $\theta p/\theta c$ is a multiple of 3. For this reason, for example, in case of the motor having 8 poles and 4 slots, the invention cannot be applied since $\theta p/\theta c=2$. Meanwhile, in cases of FIGS. 4 to 7, the invention is applied since $\theta p/\theta c$ is a multiple of 3.

Next, in a range in which the angular ratio $\theta r/\theta c$ satisfies a relationship of $\theta r/\theta c \leq \{(\theta p/\theta c)-2\}$, the angular ratio $\theta r/\theta c$ is selected as the natural number, thereby obtaining the angular ratio $\theta r/\theta c$ in which the cogging torque has the minimum value.

That is, when the angular ratio $\theta r/\theta c$ is obtained from the values of the magnetic pole angle $\theta p$ and the cogging angle $\theta c$, the angular ratio $\theta r/\theta c$ is 1 in case of the motor having 16 poles and 12 slots and the motor having 12 poles and 18 slots. The angular ratio $\theta r/\theta c$ is 1, 2, 3, and 4 in case of the motor having 10 poles and 12 slots. The angular ratio $\theta r/\theta c$ is 1, 2, 3, 4, 5, 6, and 7 in case of the motor having 8 poles and 9 slots.

Accordingly, it is understood that the cogging torque has the minimum value in a condition that the angular ratio $\theta r/\theta c$ is a natural number and $\theta r/\theta c \leq \{(\theta p/\theta c)-2\}$.

In any case, the cogging torque is 0 when the angular ratio $\theta r/\theta c$ is 0. However, in this case, since there is not provided a region where orientation direction 9 is set in a direction normal to the outer-peripheral surface of anisotropic permanent magnet 2, it is not possible to obtain much magnetic flux amount. For this reason, in a case where the angular ratio $\theta r/\theta c$ is 0, it is not possible to obtain the advantage of the invention. For this reason, it is more desirable that the angular ratio $\theta r/\theta c$ is set to the natural number in a range of $0 < \theta r/\theta c \leq \{(\theta p/\theta c)-2\}$.

As described above, the anisotropic permanent magnet motor according to the present embodiment is the motor having the number of magnetic poles and slots in which $\theta p/\theta c$ is a multiple of 3. In a range in which the angular ratio $\theta r/\theta c$ is from 0 to $\{(\theta p/\theta c)-2\}$, the angular ratio $\theta r/\theta c$ is selected as the natural number. The present motor sets the boundary angle $\theta r$ of anisotropic permanent magnet 2 on the basis of the selection. Accordingly, it is possible to restrict the cogging torque so that the cogging torque has the minimum value.

In the present embodiment, a condition suitable for restricting the cogging torque will be described further as below.

Here, as shown in FIGS. 4 to 7, in case of the motor having 16 poles and 12 slots and the motor having 12 poles and 18 slots, the cogging torque is reduced when the angular ratio $\theta r/\theta c$ is not more than 1. In case of the motor having 10 poles and 12 slots, the cogging torque is reduced when the angular ratio $\theta r/\theta c$ is not more than 4. In case of the motor having 8 poles and 9 slots, the cogging torque is reduced when the angular ratio $\theta r/\theta c$ is not more than 7. That is, it is understood that the cogging torque is restricted to be low in a region where the angular ratio $\theta r/\theta c$ is not more than P shown in the respective drawings, but rapidly increases when the angular ratio $\theta r/\theta c$ exceeds P.

Accordingly, in case of the motor having 16 poles and 12 slots and the motor having 12 poles and 18 slots, if the cogging torque is not more than the maximum value of the cogging torque when the angular ratio $\theta r/\theta c$ is not more than 1, it is possible to sufficiently reduce the cogging torque. In the same manner, in case of the motor having 10 poles and 12 slots, if the cogging torque is not more than the maximum value of the cogging torque when the angular ratio $\theta r/\theta c$ is not more than 4, it is possible to sufficiently reduce the cogging torque. In case of the motor having 8 poles and 9 slots, if the cogging torque is not more than the maximum value of the cogging torque when the angular ratio $\theta r/\theta c$ is not more than 7, it is possible to sufficiently reduce the cogging torque. In FIGS. 4 to 7, the maximum value of the cogging torque in a range of $0 < \theta r/\theta c \leq \{(\theta p/\theta c)-2\}$ is denoted by an allowable maximum value Cmax, and the angular ratio $\theta r/\theta c$ corresponding to the maximum value is denoted by a maximum angular ratio Q.

In a range of the angular ratio $\theta r/\theta c$ that the cogging torque is not more than the allowable maximum value Cmax, as understood from FIGS. 4 to 7, $0 < \theta r/\theta c \leq P$. That is, in case of the motor having 12 poles and 18 slots shown in FIG. 4, in a range of the angular ratio $\theta r/\theta c$ from 0 to P, the cogging torque is restricted to be not more than the allowable maximum value Cmax. Accordingly, when the boundary angle $\theta r$ is set in a range of the angular ratio $\theta r/\theta c$ from 0 to P, it is possible to appropriately restrict the cogging torque to be not more than the allowable maximum value and thus to obtain the advantage of the invention.

The angular ratio $\theta r/\theta c$ equal to P is obtained as below. First, the maximum value of the cogging torque in a range of $0 < \theta r/\theta c \leq \{(\theta p/\theta c)-2\}$ is obtained. Subsequently, the angular ratio $\theta r/\theta c$ is obtained in which the value of the cogging torque is equal to the allowable maximum value Cmax as the maximum value of the cogging torque in a range of $\{(\theta p/\theta c)-2\} < \theta r/\theta c \leq \{(\theta p/\theta c)-1\}$. The angular ratio $\theta r/\theta c$ obtained in this manner is the allowable maximum angular ratio P indicating the allowable maximum value in the angular ratio.

As described above, since the angular ratio $\theta r/\theta c$ corresponding to the cogging torque equal to the allowable maximum value Cmax is obtained in a range in which the angular ratio $\theta r/\theta c$ satisfies the relationship of $\{(\theta p/\theta c)-2\} \leq \theta r/\theta c \leq \{(\theta p/\theta c)-1\}$, and the boundary angle $\theta r$ is set so that the angular ratio $\theta r/\theta c$ is not more than the allowable maximum angular ratio P, where the obtained angular ratio θr/θc is denoted by the allowable maximum angular ratio P, it is possible to reduce the cogging torque with thin anisotropic permanent magnet. Further, since the boundary angle θr is set so as to obtain the maximum value in a range in which the angular ratio θr/θc is not more than the allowable maximum value Cmax, it is possible to increase an amount of magnetic flux interlinked with the stator and to realize an increase in torque. Accordingly, it is possible to improve efficiency of the motor.

As shown in FIG. 2, when a width of the outer periphery of anisotropic permanent magnet 2 corresponding to the range of both θr°/2 from the magnetic pole center of anisotropic permanent magnet 2 is denoted by lr and a width of teeth 3 is denoted by lt, it is desirable that anisotropic permanent magnet 2 satisfies a relationship of lt/lr≧a. The reason why the relationship of lt/lr≧a is desirable will be described.

Figure 8:
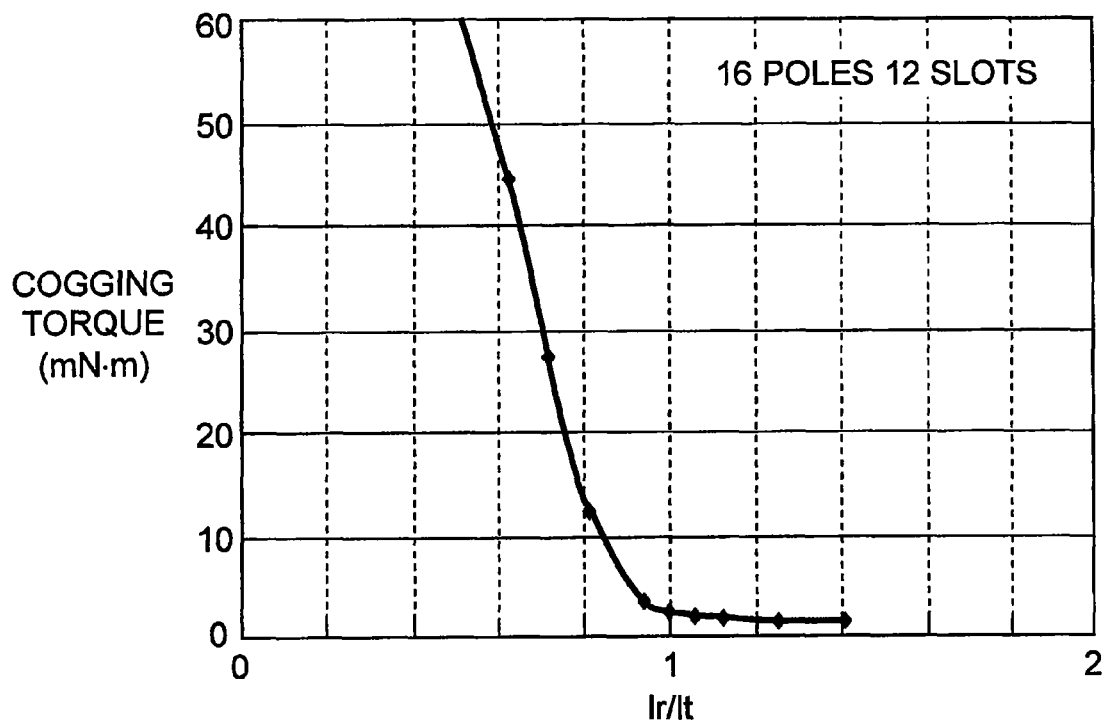
FIG. 8 is a diagram illustrating a relationship between the cogging torque and lt/lr in case of the motor having 16 poles and 12 slots according to the embodiment of the invention.
Figure 9:
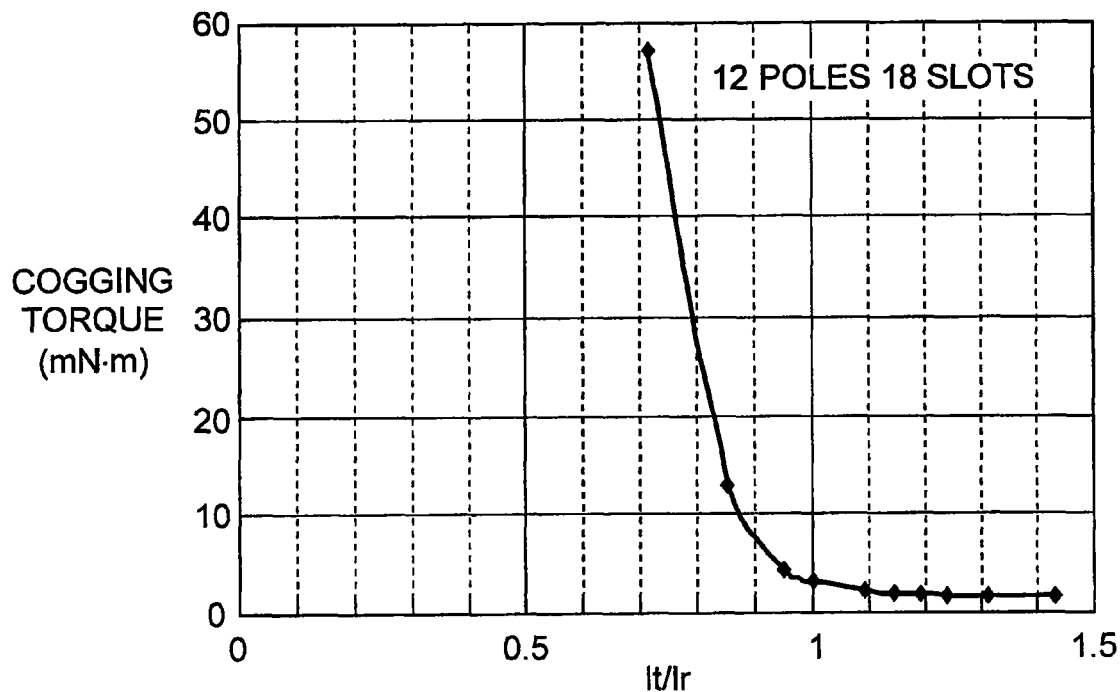
FIG. 9 is a diagram illustrating a relationship between the cogging torque and lt/lr in case of the motor having 12 poles and 18 slots according to the embodiment of the invention.
Figure 10:
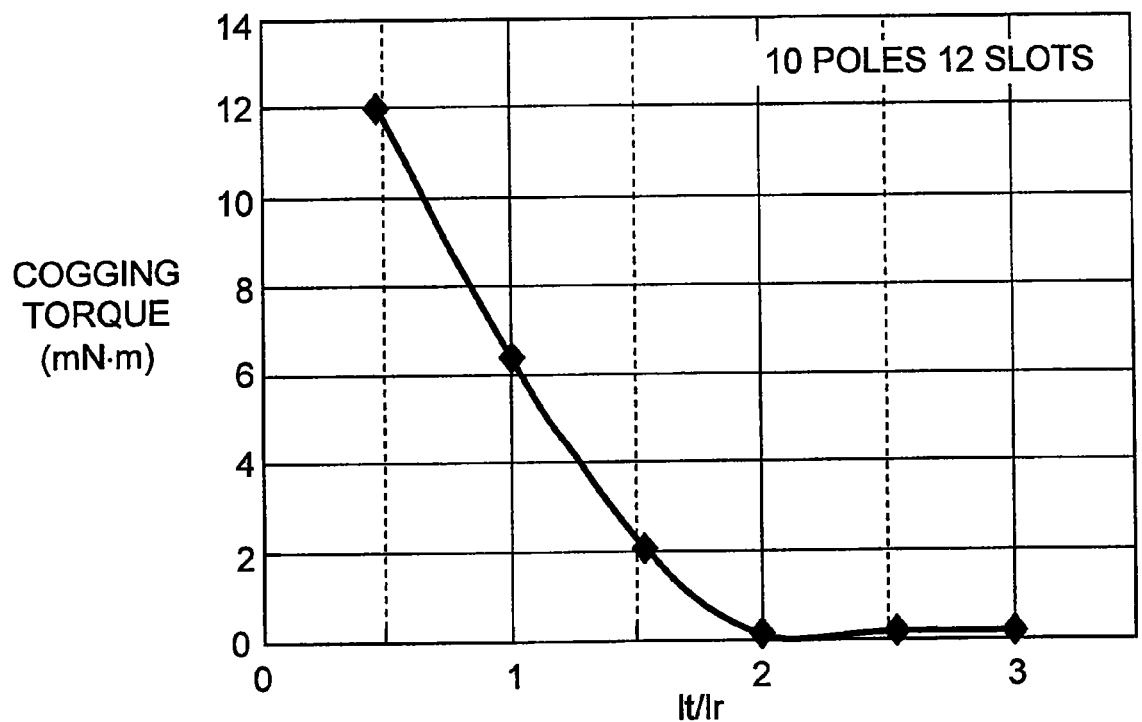
FIG. 10 is a diagram illustrating a relationship between the cogging torque and lt/lr in case of the motor having 10 poles and 12 slots according to the embodiment of the invention.
Figure 11:
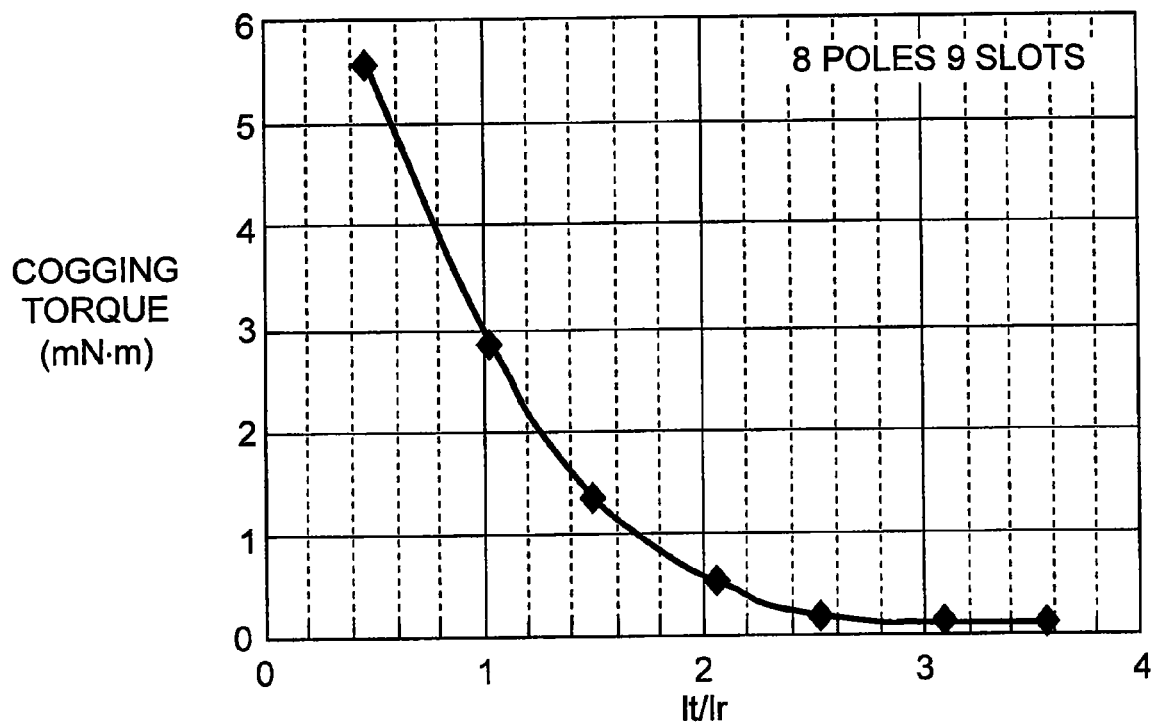
FIG. 11 is a diagram illustrating a relationship between the cogging torque and lt/lr in case of the motor having 8 poles and 9 slots according to the embodiment of the invention.

FIG. 8 is a diagram illustrating a relationship between the cogging torque and lt/lr in case of the anisotropic permanent magnet motor having 16 poles and 12 slots. FIG. 9 is a diagram illustrating a relationship between the cogging torque and lt/lr in case of the anisotropic permanent magnet motor having 12 poles and 18 slots. FIG. 10 is a diagram illustrating a relationship between the cogging torque and lt/lr in case of the anisotropic permanent magnet motor having 10 poles and 12 slots. FIG. 11 is a diagram illustrating a relationship between the cogging torque and lt/lr in case of the anisotropic permanent magnet motor having 8 poles and 9 slots.

As shown in FIGS. 8 to 11, in case of the anisotropic permanent magnet motor having 16 poles and 12 slots and the anisotropic permanent magnet motor having 12 poles and 18 slots, it is understood that the cogging torque has the minimum value when lt/lr is not less than 1. In case of the anisotropic permanent magnet motor having 10 poles and 12 slots, the cogging torque has the minimum value when lt/lr is not less than 2. In case of the anisotropic permanent magnet motor having 8 poles and 9 slots, the cogging torque has the minimum value when lt/lr is not less than 3.

Here, when the natural number a is obtained from the values of the magnetic pole angle θp and the cogging angle θc, the natural number is 1 in case of the anisotropic permanent magnet motor having 16 poles and 12 slots and the anisotropic permanent magnet motor having 12 poles and 18 slots, the natural number is 2 in case of the anisotropic permanent magnet motor having 10 poles and 12 slots, and then the natural number is 3 in case of the anisotropic permanent magnet motor having 8 poles and 9 slots. Accordingly, it is understood that the cogging torque has the minimum value in case of lt/lr≧a.

Figure 12:
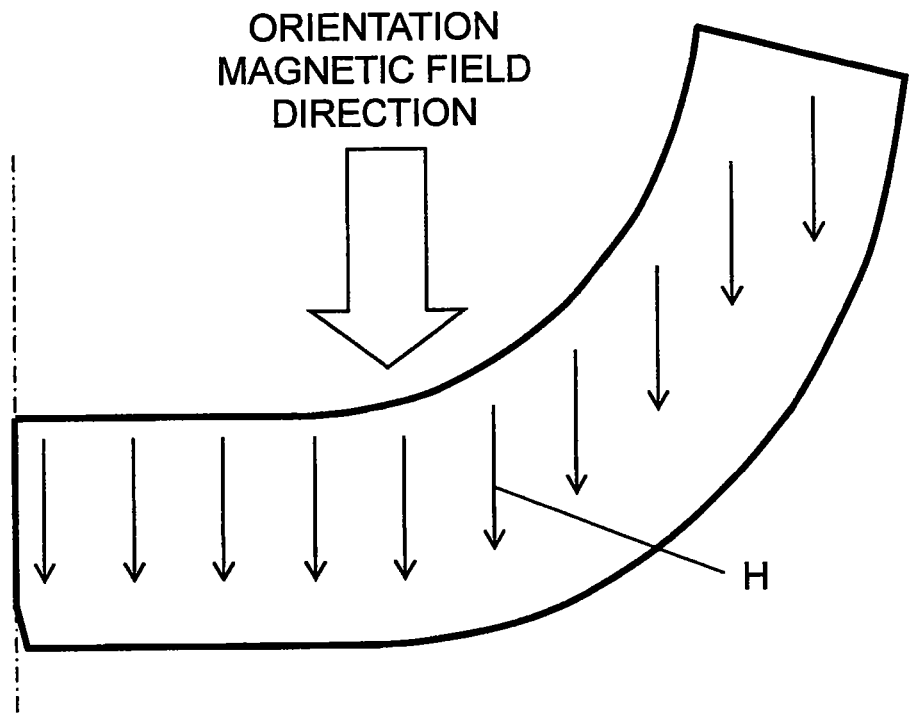
FIG. 12 is a partially cross-sectional diagram illustrating the anisotropic permanent magnet upon manufacturing the motor according to the embodiment of the invention.
Figure 13:
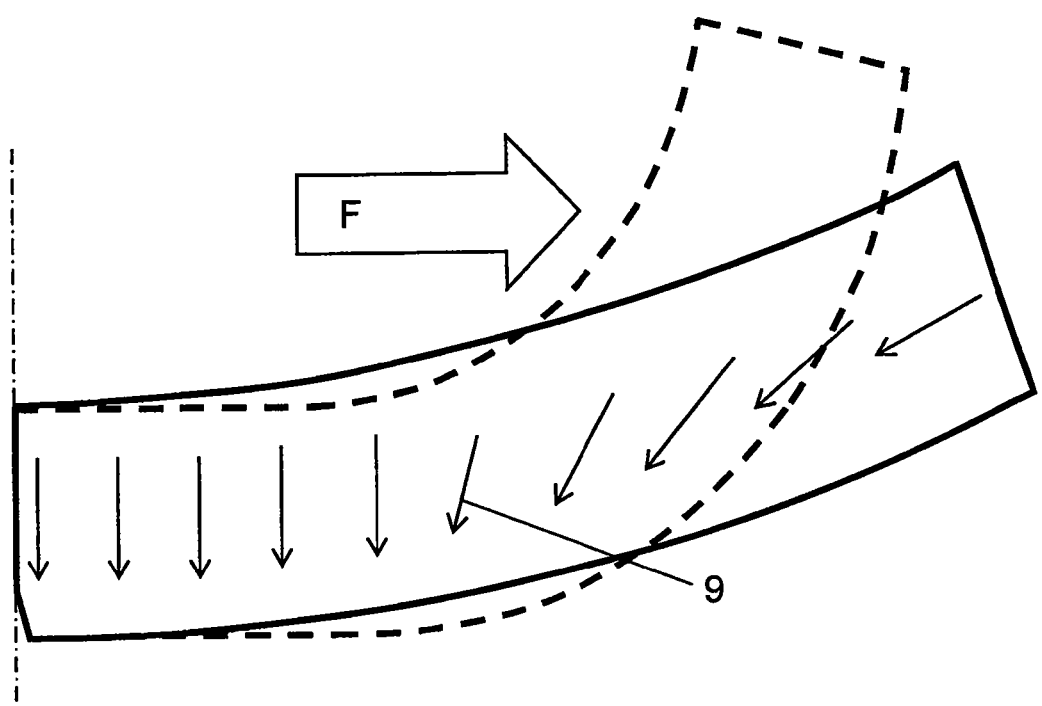
FIG. 13 is a partially cross-sectional diagram illustrating the anisotropic permanent magnet upon manufacturing the motor according to the embodiment of the invention.
Figure 15:
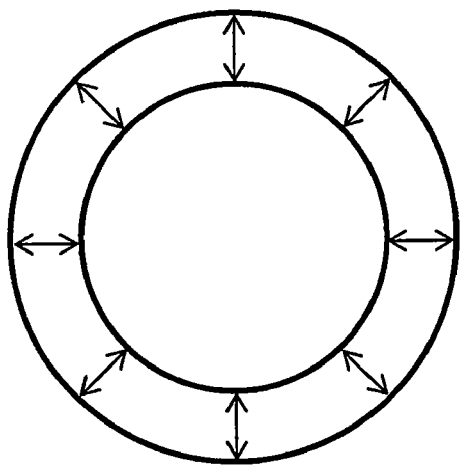
FIG. 15 is a conceptual diagram illustrating a magnetic flux direction in case of radial orientation and magnetization and a magnetic flux direction in case of polar anisotropic orientation and magnetization according to the related art.
Figure 15:
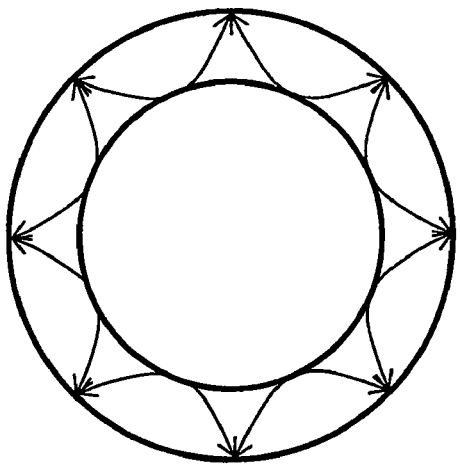

Next, a process will be described in which anisotropic permanent magnet 2 according to the invention is manufactured. FIGS. 12 and 13 are cross-sectional diagrams illustrating anisotropic permanent magnet 2 upon manufacturing the motor.

As shown in FIG. 12, a uniform orientation magnetic field H is formed. Subsequently, material for forming anisotropic permanent magnet 2 is disposed so that the orientation direction in the vicinity of the magnetic pole center is set in a direction normal to the outer-peripheral surface and the orientation direction at the magnetic pole end is set in a direction tangential to the outer-peripheral surface. Subsequently, in terms of a load F during a rolling process, the magnetic pole is formed into a circular-arc shape shown in FIG. 13. Accordingly, orientation direction 9 is adjusted to be set in a direction normal to the outer-peripheral surface in the range of both θr°/2 from the magnetic pole center, and to be continuously inclined toward the magnetic pole end with respect to a direction normal to the outer-peripheral surface. Here, FIGS. 12 and 13 show a right half sectional shape from the magnetic pole center.

Next, the anisotropic permanent magnet motor according to the embodiment of the invention will be compared with the motor according to the related art. FIG. 14 is a diagram comparing the motor according to Comparative Example with the anisotropic permanent magnet motor according to Examples of the invention.

In FIG. 14, the motor according to the Comparative Example adopts the 16-pole-12-slot permanent magnet which is radially oriented and magnetized. On the other hand, the motor according to Example 1 adopts the 16-pole-12-slot anisotropic permanent magnet of which the angular ratio θr/θc is 1 and lt/lr is 1. The motor according to Example 2 adopts the 8-pole-9-slot anisotropic permanent magnet of which the angular ratio θr/θc is 1 and lt/lr is 3. The motor according to Example 3 adopts the 8-pole-9-slot anisotropic permanent magnet of which the angular ratio θr/θc is 6 and lt/lr is 3.

As a comparison result between Example 1 and the Comparative Example, it is understood that the cogging torque of Example 1 is more reduced than that of the Comparative Example by 95% or so. It is understood that a torque constant of Example 1 is more improved than that of the Comparative Example by 2% or so.

Next, as a comparison result between Example 2 and Comparative Example, it is understood that the cogging torque of Example 2 is more reduced than that of the Comparative Example by 99.9% or so.

Next, as a comparison result between Example 3 and Comparative Example, it is understood that the cogging torque of Example 3 is more reduced than that of the Comparative Example by 99.5% or so. It is understood that the torque constant of Example 3 is more improved than that of the Comparative Example by 12% or so.

As described above, small-size anisotropic permanent magnet 2 according to the invention is capable of reducing the cogging torque.

Here, the fact that the cogging torque is reduced in terms of the condition of the angular ratio θr/θc is proved in the following equation. Equation 1 shows a cogging torque generating condition caused by a dissymmetric state of the magnetic pole. Here, μ0 denotes space permeability, lg denotes a length of a gap, ls denotes a length of a shaft, rg denotes a radius of a gap, θ denotes a rotary angle of a rotor, φ denotes a circumferential position of a gap portion, $(\Lambda^2)_{k \cdot Zst}$ denotes an amplitude of a k·Zst component of a space of $\Lambda^2(\phi)$, $\delta_{k \cdot Zst}$ denotes an initial phase of a k·Zst component of the space of $\Lambda^2(\phi)$, $(F^2)_j$ denotes an amplitude of a j component of a space of magnetomotive force distribution of a gap portion, and Zst denotes the number of slots of a stator.

$$T_C(\theta) = -\frac{l_g \cdot l_s \cdot r_g}{2\mu_0} \cdot \frac{\partial}{\partial \theta} \left( \oint_C \sum_{j=0}^{\infty} \sum_{k=0}^{\infty} \frac{(\Lambda^2)_{k \cdot Zst} \cdot (F^2)_j}{2} \cdot \cos\{(j - k \cdot Zst) \cdot \varphi - j \cdot \theta + (\delta_j - \delta_{k \cdot Zst})\} d\varphi \right)$$

(Equation 1)

In terms of Equation 1, it is understood that the cogging torque is generated in case of satisfying cos(j−k·Zst)=1. That is, when j=k·Zst, the cogging torque is generated.

In FIG. 14, as a comparison result between Example 1 and Comparative Example, j=1·Zst magnetomotive force component of the Comparative Example is 235.0, but j=1·Zst magnetomotive force component of Example 1 is 1.0, which shows that j=1·Zst magnetomotive force component of Example 1 is remarkably more reduced than that of the Comparative Example. Then, j=2·Zst magnetomotive force component of the Comparative Example is 52000.0, but j=2·Zst magnetomotive force component of Example 1 is 3000.0, which shows that j=2·Zst magnetomotive force component of Example 1 is remarkably more reduced than that of the Comparative Example. Then, j=3·Zst magnetomotive force component of the Comparative Example is 1740.0, but j=3·Zst magnetomotive force component of Example 1 is 128.0, which shows that j=3·Zst magnetomotive force component of Example 1 is remarkably more reduced than that of the Comparative Example. Then, j=4·Zst magnetomotive force component of the Comparative Example is 210000.0, but j=4·Zst magnetomotive force component of Example 1 is 600.0, which shows that j=4·Zst magnetomotive force component of Example 1 is remarkably more reduced than that of the Comparative Example. It is understood that the cogging torque of Example 1 is more reduced than that of the Comparative Example by 95% or so. It is understood that the torque constant of Example 1 is more improved than that of the Comparative Example by 2% or so.

Next, as a comparison result between Example 2 and Comparative Example, j=1·Zst magnetomotive force component of the Comparative Example is 235.0, but j=1·Zst magnetomotive force component of Example 2 is 0.4, which shows that j=1·Zst magnetomotive force component of Example 2 is remarkably more reduced than that of the Comparative Example. Then, j=2·Zst magnetomotive force component of the Comparative Example is 52000.0, but j=2·Zst magnetomotive force component of Example 2 is 106.0, which shows that j=2·Zst magnetomotive force component of Example 2 is remarkably more reduced than that of the Comparative Example. Then, j=3·Zst magnetomotive force component of the Comparative Example is 1740.0, but j=3·Zst magnetomotive force component of Example 2 is 0.1, which shows that j=3·Zst magnetomotive force component of Example 2 is remarkably more reduced than that of the Comparative Example. Then, j=4·Zst magnetomotive force component of the Comparative Example is 210000.0, but j=4·Zst magnetomotive force component of Example 2 is 9.4, which shows that j=4·Zst magnetomotive force component of Example 2 is remarkably more reduced than that of the Comparative Example. It is understood that the cogging torque of Example 2 is more reduced than that of the Comparative Example by 99.9% or so.

Next, as a comparison result between Example 3 and Comparative Example, j=1·Zst magnetomotive force component of the Comparative Example is 235.0, but j=1·Zst magnetomotive force component of Example 3 is 2.8, which shows that j=1·Zst magnetomotive force component of Example 3 is remarkably more reduced than that of the Comparative Example. Then, j=2·Zst magnetomotive force component of the Comparative Example is 52000.0, but j=2·Zst magnetomotive force component of Example 3 is 188.0, which shows that j=2·Zst magnetomotive force component of Example 3 is remarkably more reduced than that of the Comparative Example. Then, j=3·Zst magnetomotive force component of the Comparative Example is 1740.0, but j=3·Zst magnetomotive force component of Example 3 is 0.9, which shows that j=3·Zst magnetomotive force component of Example 3 is remarkably more reduced than that of the Comparative Example. Then, j=4·Zst magnetomotive force component of the Comparative Example is 210000.0, but j=4·Zst magnetomotive force component of Example 3 is 14.8, which shows that j=4·Zst magnetomotive force component of Example 3 is remarkably more reduced than that of the Comparative Example.

It is understood that the cogging torque of Example 3 is more reduced than that of the Comparative Example by 99.5% or so. It is understood that the torque constant of Example 3 is more improved than that of the Comparative Example by 12% or so.

As described above, it is understood that the cogging torque is reduced in terms of the condition of the angular ratio $\theta r/\theta c$.

What is claimed is:

1. An anisotropic permanent magnet motor comprising:
   a stator which includes a stator core provided with an annular stator yoke, a plurality of teeth protruding from the stator yoke in a radial direction, and a slot formed between two adjacent teeth and a plurality of coils wound around the teeth; and
   a rotor which includes a cylindrical rotor yoke and an anisotropic permanent magnet disposed on a surface of the rotor yoke facing the teeth of the stator with a gap therebetween,
   wherein the anisotropic permanent magnet has a section defined by a boundary angle $\theta r$ so as to have a magnetic pole center located at the center thereof, the anisotropic permanent magnet being magnetized therealong in orientation directions which are each normal to an outer-peripheral surface within the section defined by the boundary angle $\theta r$ and incline toward the magnetic pole center outside the section in such a manner that an inclining angle of a respective orientation direction measured from a direction normal to the outer-peripheral surface increases continuously progressively from zero as being away from the magnetic pole center but does not exceed 90 degrees,
   wherein relation $\theta p/\theta c = 3 \times a$ stands, where an angle for each pole is denoted by $\theta p$, an angle for one cycle of cogging torque generated by the anisotropic permanent magnet is denoted by $\theta c$, and a natural number is denoted by a,
   wherein when a maximum value of the cogging torque in a range of $\theta r/\theta c \leq \{(\theta p/\theta c)-2\}$ is denoted by an allowable maximum value of the cogging torque, $\theta r/\theta c$ corresponding to the cogging torque equal to the allowable maximum value in a range where $\theta r/\theta c$ satisfies a relationship of $\{(\theta p/\theta c)-2\} \leq \theta r/\theta c \leq \{(\theta p/\theta c)-1\}$ is obtained, and
   wherein when the obtained $\theta r/\theta c$ is denoted by P, an angle of $\theta r$ is set so that $\theta r/\theta c$ is not more than P.

2. The anisotropic permanent magnet motor according to claim 1, wherein when a width of the anisotropic permanent magnet corresponding to the range of both $\theta r°/2$ from the magnetic pole center of the anisotropic permanent magnet is denoted by lr and a width of the teeth is denoted by lt, a relationship of lt/lr $\geq$ a is satisfied.

3. The anisotropic permanent magnet motor according to claim 1, wherein the boundary angle $\theta r$ is set so that $\theta r/\theta c$ is a natural number not greater than $\{(\theta p/\theta c)-2\}$.

4. The anisotropic permanent magnet motor according to claim 2, wherein the boundary angle $\theta r$ is set so that $\theta r/\theta c$ is a natural number not greater than $\{(\theta p/\theta c)-2\}$.

5. The anisotropic permanent magnet motor according to claim 1, wherein the boundary angle $\theta r$ is set so that $\theta r/\theta c$ yields a maximum value in a range not more than the allowable maximum value.

6. The anisotropic permanent magnet motor according to claim 2, wherein the boundary angle $\theta r$ is set so that $\theta r/\theta c$ yields a maximum value in a range not more than the allowable maximum value.

7. The anisotropic permanent magnet motor according to claim 1, wherein the teeth protrude inward in a radial direction.

8. The anisotropic permanent magnet motor according to claim 2, wherein the teeth protrude inward in a radial direction.

* * * * *